(12) United States Patent
Doherty et al.

(10) Patent No.: US 11,959,845 B1
(45) Date of Patent: Apr. 16, 2024

(54) CRYOGENIC ANALYSIS SYSTEMS AND METHODS

(71) Applicant: MONTANA INSTRUMENTS CORPORATION, Bozeman, MT (US)

(72) Inventors: Josh Doherty, Bozeman, MT (US); Benjamin Hardesty, Flagstaff, AZ (US)

(73) Assignee: Montana Instruments Corporation, Bozeman, MT (US)

( * ) Notice: Subject to any disclaimer, the term of this patent is extended or adjusted under 35 U.S.C. 154(b) by 89 days.

(21) Appl. No.: 17/698,764

(22) Filed: Mar. 18, 2022

Related U.S. Application Data

(60) Provisional application No. 63/164,469, filed on Mar. 22, 2021.

(51) Int. Cl.
*G01N 1/42* (2006.01)
*G01N 25/14* (2006.01)

(52) U.S. Cl.
CPC .............. *G01N 1/42* (2013.01); *G01N 25/145* (2013.01)

(58) Field of Classification Search
CPC ................................. G01N 1/42; G01N 25/145
See application file for complete search history.

(56) References Cited

U.S. PATENT DOCUMENTS

| | | | | |
|---|---|---|---|---|
| 4,827,736 | A * | 5/1989 | Miura | F25D 19/006 62/51.1 |
| 5,611,207 | A * | 3/1997 | Hess | B01L 1/02 62/298 |
| 2013/0194703 | A1 * | 8/2013 | Husband | H02H 9/023 361/19 |
| 2019/0170622 | A1 * | 6/2019 | Doherty | G01N 1/42 |
| 2019/0170623 | A1 * | 6/2019 | Doherty | G01N 1/44 |
| 2020/0279680 | A1 * | 9/2020 | Mine | G01R 33/3804 |
| 2021/0262701 | A1 * | 8/2021 | Stautner | G01R 33/3815 |

* cited by examiner

*Primary Examiner* — Francis C Gray
(74) *Attorney, Agent, or Firm* — Wells St. John P.S.

(57) ABSTRACT

Cryogenic device analysis systems are provided that can include: a cold source within a first vacuum chamber; a cryogenic device mount within a second vacuum chamber, wherein the first and second vacuum chambers are separated by a vacuum barrier; a first thermal conduit extending from the cold source through the vacuum barrier to the sample mount; a first thermal switch along the first thermal conduit and operatively aligned between the cold source and the vacuum barrier. Methods for performing analysis of a cryogenic device are also provided.

21 Claims, 6 Drawing Sheets

CRYOGENIC ANALYSIS SYSTEMS AND METHODS

CROSS REFERENCE TO RELATED APPLICATION

This application claims priority to and the benefit of U.S. Provisional Patent Application Ser. No. 63/164,469 filed Mar. 22, 2021, entitled "Cryogenic Analysis Systems and Methods", the entirety of which is incorporated by reference herein.

TECHNICAL FIELD

The present disclosure relates to cryogenic device analysis systems and methods.

BACKGROUND

Cryogenics is a critical technology for the quantum information science and technology industry. Reaching stable, low temperatures near absolute zero is necessary to maintain qubit coherence, investigate quantum properties, and ultimately realize the potential of quantum applications in computing, sensing, and networking. Quantum systems rely on cryogenic devices including electrical, optical, RF, and microwave components that must operate at low, cryogenic temperatures near absolute zero. Despite advances. cryogenic devices can prove unreliable due to challenges in designing and manufacturing of components that can withstand low temperatures and multiple thermal cycles across a wide temperature range.

Testing these devices can be cumbersome and tedious to perform because of the time necessary to cool a cryogenic device down to these very low operational temperatures. Today's closed-cycle cryostats can take more than 3 hours to cool a cryogenic device to 4K. This cryogenic device exchange time can limit the number of cryogenic devices that can be tested in a day and places a bottleneck on the pace of quantum discovery.

SUMMARY

To reduce the cryogenic device exchange time of conventional cryostats by greater than 10×, a new cryostat architecture is provided herein in which the temperature and vacuum control of the cryogenic device can be controlled independently from the rest of the cryostat. Such an architecture would allow the cryogenic device to be warmed, vented to atmosphere, and exchanged—all while keeping the remaining large mass components, including the cryocooler, cold and under vacuum. Cryogenic device exchange time can be performed significantly faster, since only the mass of the cryogenic device is thermally cycled (cooled down and warmed up) during an exchange.

It has been recognized that typical cryostats used to cool devices to cryogenic temperatures thermally engage to a cold source via a thermal conduit. In these typical systems the device and cold source are always thermally engaged and located within the same vacuum chamber. Despite the desire to thermally cycle just the cryogenic device, current systems require the entire system to be thermally cycled to exchange a cryogenic device. Current cryostat architectures utilizing solid conduction heat transfer cannot allow a cryogenic device to be exchanged any faster than the time required to cool down the cold source itself; typically 60-90 minutes for a 2-stage cryocooler for example. The cryogenic device is a fraction of the mass compared to that of the cold source, thermal conduit, and associated radiation shields such that the cryogenic device exchange time is significantly reduced when only the cryogenic device is thermally cycled.

The systems of the present disclosure provide a new cryostat architecture that can include, in particular embodiments, thermal and vacuum control of the cryogenic device independent from the remainder of the analysis system. The cryogenic device and cold source are in separate vacuum spaces, and a thermal switch can be utilized to engage/disengage thermal communication between the cryogenic device and the cold source, thereby allowing for the cryogenic device to be thermally cycled and exchanged without having to thermally cycle the entire analytical system.

Cryogenic device analysis systems are provided that can include: a cold source within a first vacuum chamber; a cryogenic device mount within a second vacuum chamber, wherein the first and second vacuum chambers are separated by a vacuum barrier; a first thermal conduit extending from the cold source through the vacuum barrier to the sample mount.

Methods for performing analysis of a cryogenic device are provided, the methods can include: providing a cold source within a first vacuum chamber; thermally connecting the cold source to a cryogenic device mount within a second vacuum chamber through a vacuum barrier between the first and second vacuum chambers; within the second vacuum chamber reducing a temperature of the cryogenic device with the cold source; performing analysis of the cryogenic device while the cryogenic device is both operational and at cryogenic temperature; and disengaging the cold source from the sample mount and replacing the cryogenic device with another cryogenic device for analysis.

DRAWINGS

Embodiments of the disclosure are described below with reference to the following accompanying drawings.

DESCRIPTION

This disclosure is submitted in furtherance of the constitutional purposes of the U.S. Patent Laws "to promote the progress of science and useful arts" (Article 1, Section 8).

Cryogenic device analysis systems and methods will be described with reference to FIGS. 1-6.

Figure 1:
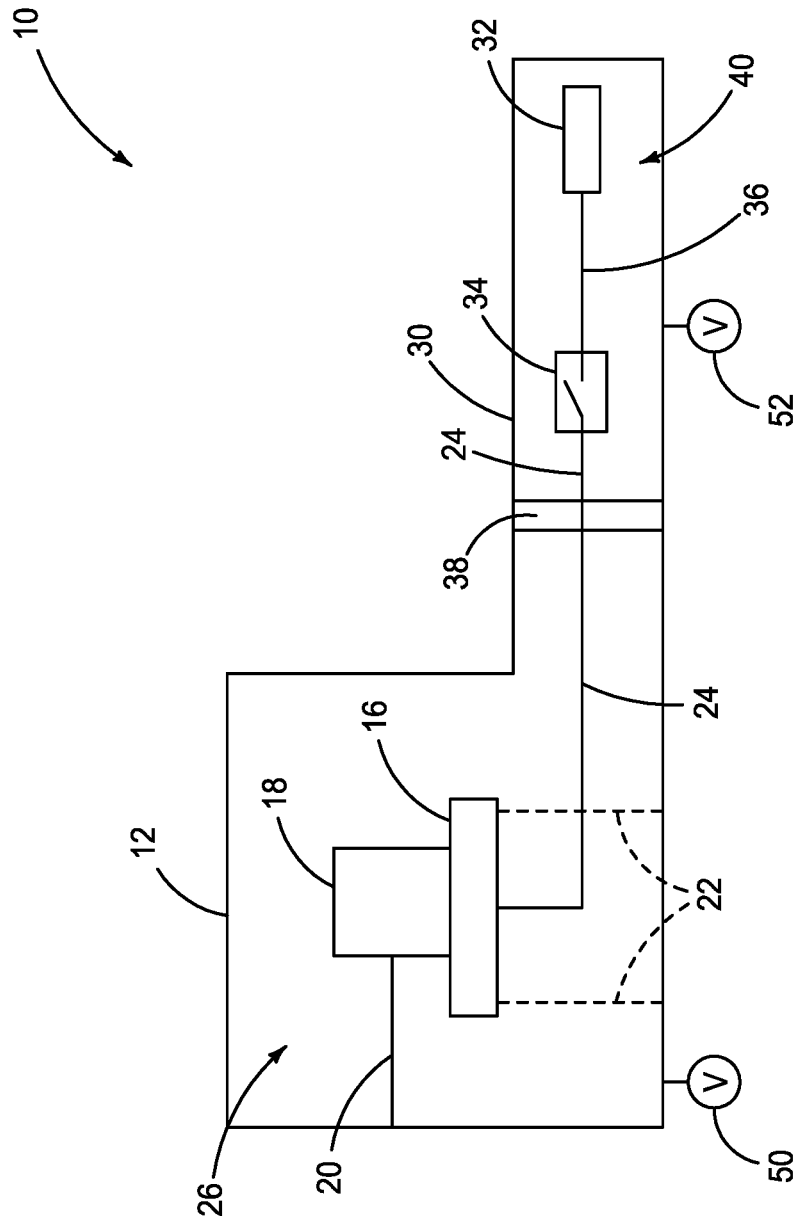
FIG. 1 is cryogenic device analysis system according to an embodiment of the disclosure.

Referring first to FIG. 1, a cryogenic device analysis system 10 is depicted that can include a cold source 32 within a first vacuum chamber 40 which can be defined by first vacuum chamber housing 30. A cryogenic device mount 16 can be within a second vacuum chamber 26 which can be defined by second vacuum chamber housing (walls) 12. Second vacuum chamber 26 defines feedthrough openings (not shown) configured to receive electrical or optical cables 20 for operative coupling to a cryogenic device 18 upon device mount 16 within second vacuum chamber 26. The feedthroughs can provide for electrical and/or optical access to cryogenic device 18. Vacuum sealing interfaces and features may be provided as part or a portion of walls 30 and/or 12 to provide user access to the cryogenic device.

First and second vacuum chambers are separated by a vacuum barrier 38. A first thermal conduit 36 in combination with conduit 24 can extend from cold source 32 through vacuum barrier 38 to cryogenic device mount 16. Vacuum barrier 38 can be a non-permeable physical barrier that can withstand a pressure differential of >15 psia. One portion of vacuum barrier 38 can be mounted or coupled to either or both of walls 30/12 and held at room temperature (295 K) while another portion is maintained at the cryogenic device temperature, for example 4K.

Vacuum barrier 38 can be configured to be thermally resistive to reduce the conductive heat load within the system and particularly to cryogenic device 18. For example, barrier 38 can be comprised of low thermally conductive materials including titanium, stainless steel, ceramic, and/or fiberglass components. Further reductions in conductive heat load can be reduced by configuring barrier 38 with low cross-sectional area and geometries that maximize the length of the conductive path. Additionally, vacuum barrier 38 can be constructed of vacuum compatible materials with minimal off-gassing and low leak rates, to support vacuum or UHV conditions. Barrier 38 may be composed of a single material, or potentially multi-material and joined using fasteners, epoxies, or various manufacturing techniques such as welding, brazing, 3D printing, and/or soldering (see U.S. Pat. No. 11,150,169 B2 issued Oct. 19, 2021, the entirety of which is incorporated by reference herein).

Vacuum barrier 38 can be a non-permeable physical boundary that separates first vacuum chamber 40 from second vacuum chamber 26. Vacuum barrier 38 may complete chamber walls of first vacuum chamber 40 and/or second vacuum chamber 26. Barrier 38 may also be separate from either or both of the walls of first or second chambers 40 or 26, for example as part of a conduit (not shown) extending between chambers 40 and 26 and configured to house thermal conduit 36 and/or 24. Barrier 38 separates the pressures within chambers 40 and 26.

A first thermal switch 34 can be operatively aligned along first thermal conduit 36 between cold source 32 and vacuum barrier 38. Thermal switches can be configured to connects/ disconnect thermal communication between cold source 32 and cryogenic device mount 16 and/or device 18 under test. With the thermal switch 34 closed, heat flows from the cryogenic device 18 to cold source 32. When switch 34 is opened, heat flow between cryogenic device 18 and cold source 32 is significantly reduced if not disconnected altogether. Various types of thermal switches, also known as heat switches, have been developed and could be employed. Examples include thermal diodes, gas-gap heat exchangers, heat pipes, superconducting heat switches, mechanical switches, and magneto resistive heat switches. The specific type of thermal switch technology can be optimized for different applications, either for use in sub-1K with low heat transfer rates or designed for low power usage for space-based applications for example.

Mechanical switches, which rely on the contact of two or more thermal conductors driven together by a mechanism, for example a screw driven by an electrical stepper motor, to close the switch may be utilized for 4K operation as it allows for thermal contact interface design freedom, ease of control using off-the-shelf force transducers, and motion components that support fully automated control. While shown to be within chamber 40, in other embodiments thermal switch 34 can be located in chamber 26.

Device analysis system 10 can also include first thermally insulative cryogenic device mount supports 22 extending between cryogenic device mount 16 and walls 12 of second vacuum chamber 26. Vacuum barrier 38 can be a portion of first vacuum chamber 40. Vacuum barrier 38 can have be a portion of second vacuum chamber 26. Vacuum barrier 38 can be a portion of both first and second vacuum chambers (40/26).

In accordance with at least one example, cryogenic device 18 to be cooled is thermally engaged with cold source 32 via first and second thermal conduits 36/24. Cryogenic device 18 resides in second vacuum chamber 26 and cold source 32 in first vacuum chamber 40. Second vacuum chamber 26 and first vacuum chamber 40 can share walls. For example, chamber walls 30 may be contiguous with chamber walls 12 as shown. Alternatively, chamber walls 30 and chamber walls 12 may not be contiguous.

Cryogenic device 18 is mounted to and thermally engaged with a cryogenic device mount 16. Cryogenic device mount 16 is mechanically supported by a cryogenic device support structure that can include first thermally insulative cryogenic device mount supports 22 (thermally insulative supports) extending between cryogenic device mount 16 and walls of second vacuum chamber 26.

Thermally insulative supports can be a structure that mechanically supports substrates that are thermally coupled to cold source 32, for example, cryogenic device 18 and/or cryogenic device mount 16. Thermally insulative supports can be configured to minimize heat transfer from where the insulative support is mounted to the walls (substrate) of the vacuum chamber, typically at room temperature, to the cryogenic device. The supports can also be configured to reduce vibrations at the cryogenic device; the support can be a high-stiffness structure. The cryogenic device support structure 22 can be constructed of materials and in geometries resulting in a thermally resistive, stiff structure. For example, it may be composed of titanium, stainless steel, aluminum, ceramics, and/or fiberglass components. It could be composed of a single material, or potentially multi-material and joined using fasteners, epoxies, or various manufacturing techniques such as welding, brazing, 3D printing, and/or soldering.

Conduits 36/24 transfer thermal energy (heat) between cryogenic device mount 16 and cold source 32 and, by example, to and from the cryogenic device 18 to cold source 32. Thermal conduit 24 is in the second vacuum chamber 26 and thermal conduit 36 is in first vacuum chamber 40. Thermal switch 34 is located between mount 16 and cold source 32 to engage/disengage thermal communication between cryogenic device 18 and cold source 32.

Cryogenic device 18 can be a device or component to be analyzed at a cryogenic temperature of interest. Device 18 can be, for example, an electronic or optical device used in a quantum computer, including for example an RF amplifier, that is tested and qualified for use prior to installation in a quantum computer. Device 18 can include or be supported by processing circuitry that can be operatively connected to a quantum computing system for operation at cryogenic temperatures. Accordingly, device 18 can be configured to be coupled to and operated with electrical or optical cables 20, which, in example embodiments can be operationally coupled to processing circuitry (not shown) that can be utilized to monitor and/or operate device 18 during analysis using the systems of the present disclosure.

Cold source 32 is a source of heat or cold energy that can be used to heat or cool cryogenic device 18. Example cold source 32 can include a mechanical cryocooler, with either one or multiple cooling stages, or for example a dewar of fluid cryogen such as helium or nitrogen.

Thermal conduits of the present disclosure can be a conduit that can transfer heat to and/or from cold source 32 to a cryogenic device 18 via sample mount 16. The conduits can facilitate heat transfer via solid conduction through, for example, a copper bar or rod (not shown). The conduits can also include a fluid conduit that transfers fluid cryogens to or from a cold source to cryogenic device 18.

Chamber walls 30 and/or 12 can be a non-permeable structure capable of maintaining an interior vacuum pressure, for example <1 E-7 Torr or possibly ultra-high-vacuum (UHV) conditions <1 E-11 Torr. Walls 30 and/or 12 can be made of machined aluminum for example or a welded metal structure.

Figure 2:
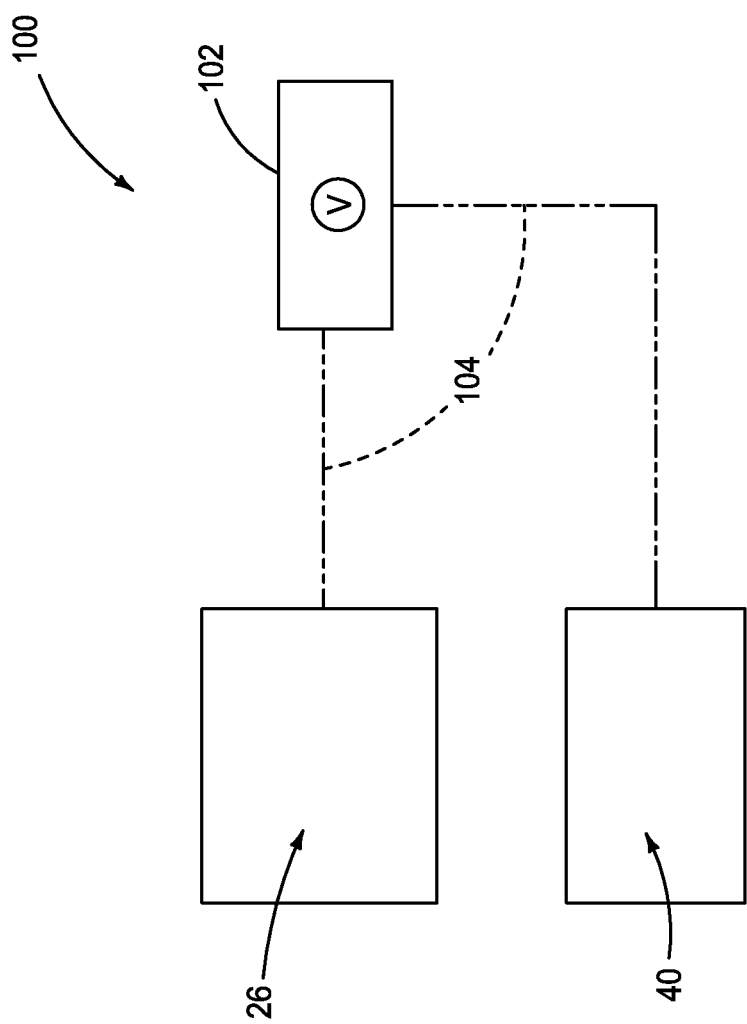
FIG. 2 is a vacuum system for use in a cryogenic device analysis system according to an embodiment of the disclosure.

System 10 can include vacuum systems 50 and/or 52 for example. These systems can be a single system and/or multiple systems that may operate independently of one another. For example, chambers 40 and 26 can be independently controlled using vacuum control components 100 that are connected to each of the vacuum chambers 26 and 40 via vacuum hoses 104 as shown in FIG. 2. A vacuum control module 102 can include a vacuum pump, pressure gauges, valves, electronics, and software control to pull vacuum and vent either one or both of chambers 40/26. The control of each pressure within the chambers can be independent, such that one chamber can be under vacuum conditions, <1 E-7 Torr for example, while the other chamber is simultaneously vented to atmosphere.

The temperature of cryogenic device 18 can be controlled with a thermometer and heater either attached to cryogenic device 18 and/or the cryogenic device mount 16. The temperature can be controlled via a PID loop or other control logic that controls the heater output, for example by increasing current applied to a resistive heater, to achieve a desired cryogenic device temperature. Accordingly, systems of the present disclosure may be operatively controlled with processing circuitry not shown.

In accordance with at least one example, when cryogenic device 18 and cold source 32 are cold and the vacuum chambers 26 and 40 are under vacuum, the process for cryogenically cooling a new cryogenic device can include:
1) Disengaging the thermal switch to stop or significantly reduce the heat transfer between the cryogenic device 18 and the cold source 32.
2) Warming the cryogenic device 18 to room temperature by controlling cryogenic device heater (part of sample mount and not shown) and turning off the heater once it reaches room temperature.
3) Venting chamber 26 to atmosphere.
4) Exchanging cryogenic device 18 for alternative device for analysis.
5) Pulling vacuum to reduce the pressure within chamber 26.
6) Engaging thermal switch 34 so cryogenic device 18 is thermally engaged with cold source 32.

Utilizing the systems of the present disclosure, a cryogenic device exchange can be performed much faster because only the cryogenic device—whose mass is typically a fraction of the cold source mass—must be thermally cycled during a cryogenic device exchange.

Figure 3:
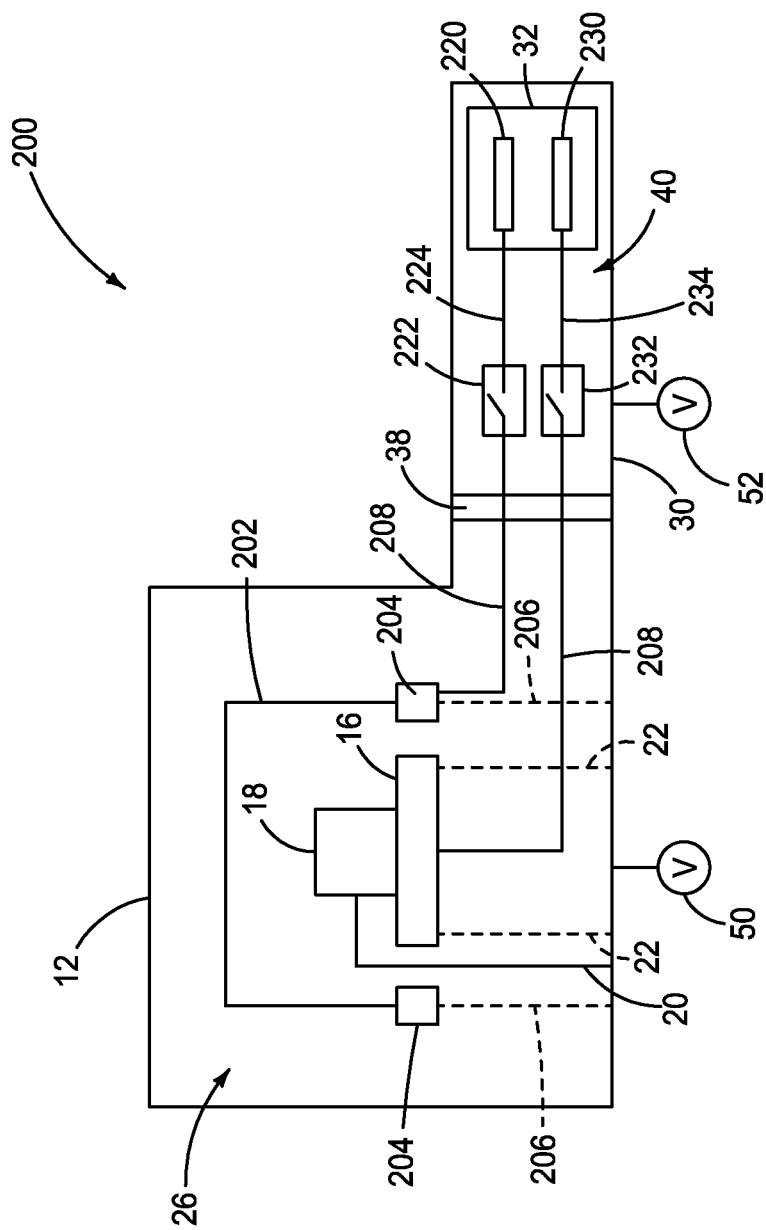
FIG. 3 is a cryogenic device analysis system according to one embodiment of the disclosure.

FIG. 3 depicts another embodiment of the disclosure. In accordance with this embodiment, multiple thermal switches 222 and 232 are used to engage multiple components (shield mounts 204 and sample mount 16) within chamber 26. In accordance with example implementations cold source 32 within chamber 40 can include at least two cold source stages 220 and 230 configured to provide different temperatures from each stage. Accordingly, the first thermal conduit 234 can extend from second stage 230 through vacuum barrier 38 to sample mount 16.

Within chamber 26 can be a thermal radiation shield 202 operatively aligned to shield either or both of cryogenic device 18 and/or device mount 16 from thermal radiation. At least one thermal radiation shield mount 204 supporting thermal radiation shield 202 can be provided. Thermally insulative shield mount supports 206 can be provided extending between the second mounts 204 and the walls of the vacuum chamber 26. To facilitate thermal control of shield 202 and mounts 204, thermal conduit 224/208 is provided extending from cold source stage 1 220 to the thermal radiation shield mount 204. System 200 can also include another thermal switch 222 along the thermal conduit 224/208 and operatively aligned between cold source 32 and vacuum barrier 38.

Accordingly, inside chamber 26 is radiation shield 202 that shields cryogenic device 16 from radiative heat loads from walls 12 of chamber 26 when maintained at room temperature. Cold source 32 is shown to have two stages, representing for example a Pulse Tube or Gifford-McMahon cryocooler with two stages operating at different temperatures: 40K on stage 220 for example and 4K on stage 230. Cryogenic device 18 is in thermal communication with the stage 230 cold source via thermal conduits 234/208 in chambers 26 and 40. Thermal switch 232 engages/disengages thermal communication between cryogenic device 18 and cold source stage 230. Cryogenic device 18 is thermally engaged with cryogenic device mount 16 that is supported by a cryogenic device support structure 22.

Radiation shield 202 is in thermal communication with the stage 220 cold source via thermal conduits 224/208 in chambers 40 and 26. Thermal switch 222 engages/disengages the thermal communication between radiation shield mount 204 and cold source stage 220 via the cold source stage thermal conduit 224/208. Radiation shield 202 is thermally engaged with radiation shield mount 204 that is supported by a insulative radiation shield mount support structure 206.

Thermal switches 222/232 can be operated independently. For example, cryogenic device 18, in thermal communication with cold source stage 230, can be held at 4K for example. Radiation shield 202, in thermal communication with cold source stage 220, can be held at 40K for example. The temperature of cryogenic device 18 and radiation shield 202 can be independently controlled using heaters, thermometers, and processing circuitry (software) to control heater power to achieve desired temperature setpoints.

Radiation shield support 206 and cryogenic device support 22 are separate components. In other embodiments, the supporting structure may be a single component that includes an integrated radiation shield mount and a cryogenic device mount.

Figure 4:
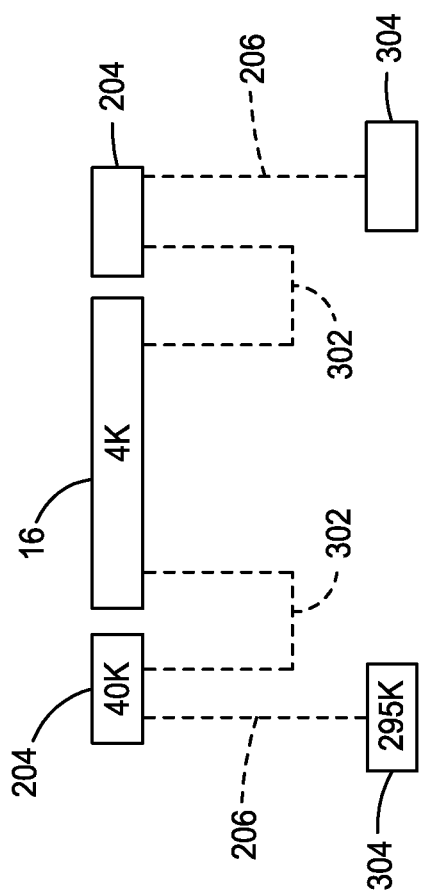
FIG. 4 is a cryogenic device mount and radiation shield mount system for use in a cryogenic analysis system according to an embodiment of the disclosure.

FIG. 4 shows an example embodiment of an example support structure. The structure can be mounted via fasteners to walls 12 of chamber 26, held at room temperature, using the cryogenic device vacuum housing mount locations 304. Thermally resistive supports 206 and 302 connect walls 12 to the radiation shield mount 204 and radiation shield mount to the cryogenic device mount, respectively. These supports are thermally resistive as to reduce conductive heat transfer through the supports to the radiation shield mount 204 and cryogenic device mount 16. Cryogenic device 18 and radiation shield 202 can be mounted to cryogenic device mount 16 and radiation shield mount 204, respectively, using fasteners.

In other embodiments, radiation shield 202 and radiation shield mount 204 in FIG. 3 could be replaced with other components that are in thermal communication with cold source stage 220 and thermal switch 222. For example, radiation shield mount 204 could be replaced with a thermal lagging component that is used to thermally lag electrical wires, optical fibers, gas tubes, RF coax, and etc. that enter the cryogenic device vacuum space via feedthroughs in walls 12 of chamber 26 and are used to monitor or control cryogenic device 18. Thermally lagging such components, at cold source stage 220 temperature of the thermal lagging component can reduce the conductive heat load such components add to the cryogenic device.

In FIG. 1 and FIG. 3, both cryogenic device mount supports 22 and the vacuum barrier 38 are combined to have portions that are thermally cycled when a cryogenic device exchange is performed. These components are arranged to facilitate both the support and cooling/heating of device 18. Because each is mounted to the vacuum housing maintained at room temperature, both bring in heat loads that reduce the available cooling power to reduce the cryogenic device temperature, thereby increasing the time required to cooldown the cryogenic device. A faster cryogenic device cooldown, and therefore cryogenic device exchange, can be achieved by either reducing the mass of the components that must be thermally cycled and/or reducing the heat loads on the cryogenic device.

Figure 5:
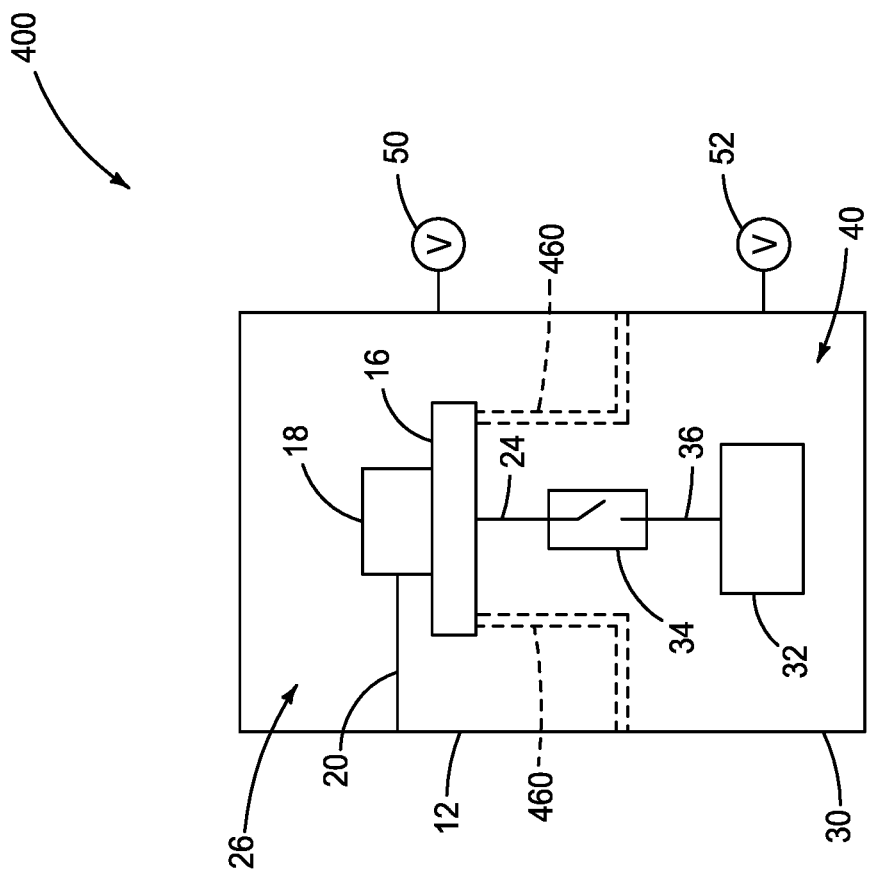
FIG. 5 is a cryogenic device analysis system according to one embodiment of the disclosure.

Accordingly, FIG. 5 shows system 400 as another embodiment of the systems of the present disclosure, wherein the cryogenic device mount supports 22 and the vacuum barrier 38 components in FIG. 1 and FIG. 3 are combined in a single component 460. Here, the vacuum barrier also serves as the physical support of the cryogenic device mount. By reducing the mass of the components that are thermally cycled during a cryogenic device exchange and the heat loads on the cryogenic device even further, the cryostat architecture in FIG. 5 can provide an even faster cryogenic device exchange time.

Figure 6:
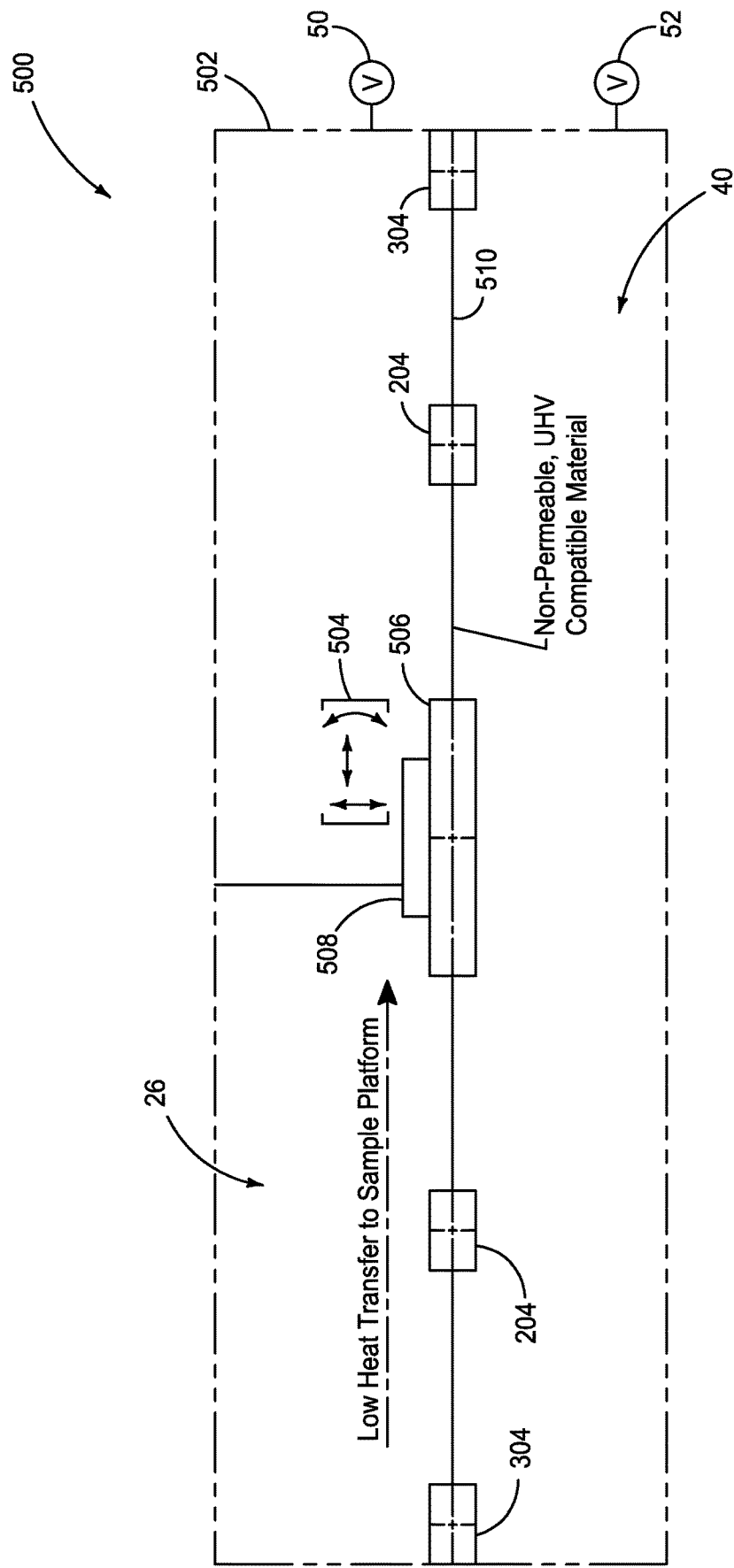
FIG. 6 is a cryogenic device analysis system according to one embodiment of the disclosure.

System 500 is depicted in FIG. 6 to include an example vacuum barrier 510 between walls 502 of vacuum chambers 26 and 40. Vacuum barrier 510 bridges a thermal gradient from 300K-4K while minimizing the heat load to cryogenic device 508. Barrier 510 also supports and reduces vibrations of cryogenic device 508. Accordingly, the vacuum barrier must be of a sufficiently high resonant frequency that the cryogenic device vibrations 504 are acceptable. Barrier 510 can provide thermal lagging/connections for a radiation shield and incoming electrical and/or optical connections to the cryogenic device. In isolating chamber 26, vacuum barrier 510 can provide an attractive option for UHV in sample chamber 26. To that end, the vacuum barrier may be designed and constructed of UHV compatible materials to enable use in future UHV applications. In accordance with example configurations, barrier 510 can include mounts 304, 204, and 506. Mounts 204 and 506 can be operatively engaged with stages 220 and 230 respectively and/or switches 222 and 232.

In compliance with the statute, embodiments of the invention have been described in language more or less specific as to structural and methodical features. It is to be understood, however, that the entire invention is not limited to the specific features and/or embodiments shown and/or described, since the disclosed embodiments comprise forms of putting the invention into effect.

The invention claimed is:

1. A cryogenic device analysis system comprising:
   a cold source within a first vacuum chamber;
   a cryogenic device mount within a second vacuum chamber, wherein the first and second vacuum chambers are separated by a vacuum barrier;
   a first thermal conduit extending from the cold source through the vacuum barrier to the sample mount; and
   a first thermal switch along the first thermal conduit and operatively aligned between the cold source and the vacuum barrier.

2. The cryogenic device analysis system of claim 1 further comprising first thermally insulative cryogenic device mount supports extending between the cryogenic device mount and walls of the second vacuum chamber.

3. The cryogenic device analysis system of claim 1 wherein the vacuum barrier is a portion of the first vacuum chamber.

4. The cryogenic device analysis system of claim 1 wherein the vacuum barrier is a portion of the second vacuum chamber.

5. The cryogenic device analysis system of claim 1 wherein the vacuum barrier is a portion of both the first and second vacuum chambers.

6. The cryogenic device analysis system of claim 1 wherein the second vacuum chamber defines feedthrough openings configured to receive electrical and/or optical cables for operative coupling to a cryogenic device upon the device mount within the second vacuum chamber.

7. The cryogenic device analysis system of claim 1 wherein the cold source within the first vacuum chamber includes at least two cold source stages configured to provide different temperatures from each stage.

8. The cryogenic device analysis system of claim 7 wherein the first thermal conduit extends from the first stage through the vacuum barrier to the cryogenic device mount.

9. The cryogenic device analysis system of claim 8 further comprising a thermal radiation shield within the second vacuum chamber and operatively aligned to shield a cryogenic device upon the cryogenic device mount from thermal radiation.

10. The cryogenic device analysis system of claim 9 further comprising at least one thermal radiation shield mount supporting the thermal radiation shield.

11. The cryogenic device analysis system of claim 10 wherein second thermally insulative mount supports extend between the second mounts and the walls of the second vacuum chamber.

12. The cryogenic device analysis system of claim 10 further comprising a second thermal conduit extending from the second cold source stage to the at least one thermal radiation shield mount.

13. The cryogenic device analysis system of claim 10 further comprising a second thermal switch along the second thermal conduit and operatively aligned between the cold source and the vacuum barrier.

14. The cryogenic device analysis system of claim 1 wherein the device mount is an integrated portion of the vacuum barrier.

15. The cryogenic device analysis system of claim 14 further comprising shield mounts integrated into the vacuum barrier.

16. The cryogenic device analysis system of claim 1 further comprising mounts integrated into the vacuum barrier.

17. A method for performing analysis using a cryogenic device, the method comprising:
- providing a cold source within a first vacuum chamber;
- thermally connecting the cold source to a cryogenic device mount within a second vacuum chamber through a vacuum barrier between the first and second vacuum chambers;
- within the second vacuum chamber reducing a temperature of the cryogenic device with the cold source;
- performing analysis using the cryogenic device while the cryogenic device is both operational and at cryogenic temperature; and
- disengaging the cold source from the cryogenic device mount and replacing the cryogenic device with another cryogenic device to perform analysis.

18. The method of claim 17 wherein the disengaging of the cold source comprises disconnecting a thermal switch.

19. The method of claim 18 further comprising shielding either or both of the device mount or the cryogenic device with a thermal radiation shield.

20. The method of claim 19 further comprising operatively engaging/disengaging the thermal radiation shield to a thermal conduit.

21. The method of claim 14 wherein the thermal conduits are operatively engaged to stages of a cold source.

* * * * *